(12) United States Patent
Gaid

(10) Patent No.: US 11,945,733 B2
(45) Date of Patent: Apr. 2, 2024

(54) METHOD FOR TREATING A FLUID BY UPFLOW THROUGH A BED OF ADSORBENT MEDIA

(71) Applicant: Veolia Water Solutions & Technologies Support, Saint-Maurice (FR)

(72) Inventor: Abdelkader Gaid, Paris (FR)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 489 days.

(21) Appl. No.: 17/057,152

(22) PCT Filed: May 22, 2019

(86) PCT No.: PCT/EP2019/063235
§ 371 (c)(1),
(2) Date: Nov. 20, 2020

(87) PCT Pub. No.: WO2019/224258
PCT Pub. Date: Nov. 28, 2019

(65) Prior Publication Data
US 2021/0206661 A1     Jul. 8, 2021

(30) Foreign Application Priority Data
May 22, 2018   (FR) ........................... 1854254

(51) Int. Cl.
*C02F 1/28*   (2023.01)
(52) U.S. Cl.
CPC .............. *C02F 1/283* (2013.01); *C02F 1/281* (2013.01); *C02F 2201/002* (2013.01);
(Continued)

(58) Field of Classification Search
None
See application file for complete search history.

(56) References Cited

U.S. PATENT DOCUMENTS 5,028,333 A * 7/1991 Wright ............... B01D 21/2427
                                                           210/522
8,110,110 B2    2/2012 Croue et al.
(Continued)

FOREIGN PATENT DOCUMENTS

CN          1803662 A    7/2006
EP          0434484 A1   6/1991
(Continued)

*Primary Examiner* — Chester T Barry
(74) *Attorney, Agent, or Firm* — COATS & BENNETT, PLLC

(57) ABSTRACT

Plant (1) intended for the treatment of a fluid (15) by passage of an upflow (90) of said fluid (15) through a bed of adsorbent media particles (13). The plant (1) comprises a reactor (2) intended to contain the bed of adsorbent media particles (13), comprising:
- a means for injecting and distributing fluid to be treated, disposed at the bottom part, for forming the upflow (90) of fluid (15) within the reactor (2) and enabling the fluidization and expansion of said bed of adsorbent media particles (13);
- a means for recovering treated fluid;
- a means for deflecting fluid (20) disposed at the top part, intended for reducing the speed of the upflow (90) of fluid (15) and enabling the formation of a tranquil zone (27), said means for recovering treated fluid being disposed downstream from said tranquil zone (27).

11 Claims, 4 Drawing Sheets

(52) U.S. Cl.
CPC .... *C02F 2301/02* (2013.01); *C02F 2301/046* (2013.01); *C02F 2303/16* (2013.01); *C02F 2303/24* (2013.01)

(56) References Cited

U.S. PATENT DOCUMENTS

| | | | |
|---|---|---|---|
| 2002/0000409 A1 | 1/2002 | Lanting et al. | |
| 2009/0145846 A1* | 6/2009 | Burns | B01J 47/10 210/661 |
| 2014/0346402 A1* | 11/2014 | Tetzlaff | B01J 12/007 252/373 |

FOREIGN PATENT DOCUMENTS

| | | | | |
|---|---|---|---|---|
| FR | 2694209 A1 * | 2/1994 | ......... | B01D 24/4678 |
| FR | 2694209 A1 | 2/1994 | | |
| FR | 2874913 A1 * | 3/2006 | ............. | C02F 1/283 |
| FR | 2874913 A1 | 3/2006 | | |
| FR | 2894243 A1 | 6/2007 | | |
| GB | 1428642 A * | 3/1976 | ................ | B01J 8/20 |

\* cited by examiner

METHOD FOR TREATING A FLUID BY UPFLOW THROUGH A BED OF ADSORBENT MEDIA

1. FIELD OF THE INVENTION

The present invention relates to the field of the treatment of water by upflow on fluidized adsorbent media in a reactor.

The present invention is suitable for reducing or removing organic substances, micropollutants and/or metal ions in water using activated carbon as an adsorbent medium.

2. PRIOR ART

There are various methods using activated carbon reactors that work in upflow mode.

The French patent application publication FR-A-2874913 describes especially a method for treating a fluid using a reactor working in upflow mode in a bed of activated carbon while at the same time ensuring gravitational separation, at the top of the reactor, between the activated carbon particles and the fluid. The treated fluid is then recovered by overflow. The average concentration in activated carbon is from 100 to 300 g/L on the height of the expanded bed and the average concentration in activated carbon is lower than 2 mg/L in the upper part of the settled or decanted bed area. The particle size of the activated carbon used is from 100 to 800 µm and the upward speed of the fluid is from 2 to 20 m/h, advantageously from 8 to 15 m/h. The contact time is from 5 to 60 min, advantageously from 8 to 15 min.

Besides, the patent application publication FR-A-3003477 describes especially a method of treatment of a fluid using a compact activated-carbon-adsorption upflow reactor for the simultaneous elimination of organic substances and micropollutants. As in case of the above-mentioned patent application, the water to be treated is admitted uniformly into the bottom of the structure to cross the bed of activated carbon from bottom to top. The reactor works at a speed that is low enough not to prompt any significant expansion of the activated carbon bed, thus ensuring both filtration and adsorption of the matter present in the water. The upward speed of the fluid then varies from 10 to 20 m/h and preferably from 12 to 15 m/h. An expansion phase is planned during which the water circulates at a speed of 15 to 40 m/h, high enough to prompt a significant expansion of the activated carbon bed which then undergoes washing by water. The particle size of the activated carbon used is from 0.3 to 1.5 mm and preferably from 0.6 to 1.2 mm.

The minimum fluidization speed of a media bed constituted by solid particles is the minimum speed that a fluid must have to allow a slight motion of the particles which get suspended. This speed depends on the size and the density of the solid particles as well as the viscosity of the fluid. It is given by the following correlation (according to Wen and Yu):

$$V_f = Re_f \cdot \mu/(d_{90} \cdot \rho), \text{ with } Re_f = (33.7^2 + 0.0408Ar)^{0.5} - 33.7$$

and $$Ar = d^3_{90} \rho(\rho_s - \rho)g/\mu^2$$

where:
$Re_f$ is the Reynolds number for fluidization;
$Ar$ is the Archimedes number;
$V_f$ is the fluidization speed (m/s);
$\rho_s$ is the bulk density of the medium (g/m$^3$);
$d_{90}$ is the diameter of the medium at 90 percent passing (m) ($=d_{10} \cdot CU^{1.67}$); and $d_{10}$ is the effective size (m) and CU is the uniformity coefficient;
$\rho$ is the bulk density of the fluid (g/m$^3$);
$\mu$ is the viscosity of the fluid (Pa·s).

Table 1 below shows the minimum values of fluidization speed for different particle sizes of activated carbon in an upflow of water:

TABLE 1

| d10 (µm) | 100 | 200 | 300 | 400 | 600 | 800 | 1200 |
|---|---|---|---|---|---|---|---|
| $V_{f(min)}$(m/h) | 0.3 | 0.5 | 1.1 | 2 | 4.5 | 7.8 | 16.2 |

When the speed of the fluid becomes greater than the minimum fluidization speed, the activated carbon bed undergoes a phenomenon of expansion in the reactor, characterized by a rate of expansion. The rate of expansion corresponds to the increase in the height of the bed during the passage of the fluid at fluidization speed as compared with the height of the bed at rest. For a given bed of particles, the expansion is equivalent to the suspension of the particles. The expansion of the particles changes according to the upward speed. Gradually increasing this speed causes the expansion to pass from a state of immobility to a state where the particles get suspended until they reach a height twice the initial height (the height at rest). In this case, the particles become independent of one another.

Table 2 here below shows the fluidization speed making it possible to obtain a given rate of expansion for a given particle size of activated carbon particles:

TABLE 2

| | Fluidization speed (m/h) | | | | | |
|---|---|---|---|---|---|---|
| Rate of expansion | 10% | 20% | 40% | 50% | 80% | 100% |
| Particle size 0.2 mm | 0.8 | 1.1 | 1.7 | 2.1 | 3.3 | 4.2 |
| Particle size 0.4 mm | 3.0 | 4.2 | 6.9 | 8.4 | 13.3 | 16.8 |
| Particle size 0.6 mm | 6.7 | 9.4 | 15.4 | 18.7 | 29.6 | 37.4 |
| Particle size 0.8 mm | 11.7 | 16.3 | 26.8 | 32.5 | 51.5 | 65.1 |
| Particle size 1.2 mm | 24.5 | 34 | 55.8 | 67.8 | 107.3 | 135.7 |

The two prior-art patent applications cited recommend a reactor sized for upflows advantageously having speeds of 8 to 15 m/h.

For the patent application FR-A-2874913, the recommended particle size for the activated carbon is from 0.1 to 0.8 mm and a maximum speed of 15 m/h is recommended. At this speed, all fines having a diameter smaller than 0.3 mm then have a rate of expansion greater than 100% and are found at the outlet along with the treated fluid.

For the patent application FR-A-3003477, the recommended particle size is from 0.6 to 1.2 mm and a maximum speed of 15 m/h is recommended in filtration/adsorption phase. At this speed, for a median particle size of 0.8 mm, the expansion of the bed is only 15%. At such a speed, it is possible to avoid a leakage of particles. However, the particles having a diameter of 1.2 mm are not fluidized and this leads to a very small expansion of the activated carbon bed during the operation. On the contrary, the washing step is carried out at a maximum speed of 40 m/h. At such a speed, the fines having a diameter smaller than or equal to 0.6 mm have an expansion of more than 100% and are present at outlet with the treated fluid.

Thus, the methods according to the prior art require an increased control of the upflow fluid speed enabling the least disadvantageous tradeoff, for a given range of particle size of activated carbon, between on the one hand sufficient expansion of the activated carbon bed, especially particles of larger particle size and, on the other hand, limited leakage of particles having of smaller particle size.

As described here above, for the particle size ranges of activated carbon usually used, it is nevertheless almost impossible with the prior-art methods to favor one approach without its being to the detriment of the other.

In order to use all the activated carbon mass present in the reactor, the activated carbon bed must generally be fluidized at a rate of expansion that can theoretically range from 10 to 100%. Below 10%, the specific surface area of the medium may not be fully used for the adsorption.

The leakage of activated carbon is also particularly detrimental since it entails an additional cost resulting especially from the reinjection of fresh activated carbon to compensate for this loss. It also causes an unnecessary overload of suspended solids (SS) in the treated fluid. This overload must be absorbed by filters positioned downstream relative to the upflow treatment method, and the filters therefore tend to clog faster.

To try and overcome the leakage of the particles of the fluidized bed while at the same time maintaining a sufficiently high upflow speed, the users of methods such as those of the prior art can inject a polymer in order to form an activated carbon floc.

This represents an additional step and an additional cost in the implementing of the method.

3. GOALS OF THE INVENTION

The invention is aimed at overcoming at least some of the drawbacks of the prior art.

The invention is aimed especially at proposing a plant for the treatment of a fluid by upflow through a bed of adsorbent media enabling an efficient fluidization of the bed of adsorbent media while at the same time greatly limiting or even preventing any loss of adsorbent media.

It is another goal of the invention, according to at least certain embodiments, to propose a plant for limiting fluid losses.

It is another goal of the invention, according to at least certain embodiments, to propose a plant that is more efficient and more compact than the prior-art plants.

It is also a goal of the invention to propose methods of operation of the plant according to the invention.

It is another goal of the invention, according to at least certain embodiments, to propose a method for optimally reducing the consumption of adsorbent media.

It is another goal of the invention, according to at least certain embodiments, to propose a method that does not require the addition of ballast or weighting polymers.

4. SUMMARY OF THE INVENTION

The invention relates to a plant for the treatment of a fluid by making an upflow of this fluid pass through a bed of adsorbent media particles.

The invention comprises a reactor intended to contain the bed of adsorbent media particles, the reactor comprising:
- a means for injecting and distributing fluid to be treated, disposed at the bottom part, for forming the upflow of fluid within the reactor and enabling the fluidization and expansion of the bed of adsorbent media particles;
- a means for deflecting fluid, disposed at the top part, for reducing the speed of the upflow of fluid and enable the formation of a fluid tranquil zone;
- a means for recovering treated fluid, disposed downstream from the tranquil zone; and
- optionally: a means for injecting adsorbent media particles, a means for extracting adsorbent media particles and a means for recirculating treated fluid.

The inventive concept of the present invention relies especially on the presence of the means for deflecting fluid disposed at the top part of the reactor. Indeed, the means of deflection reduce the upflow speed of fluid and thus create a tranquil zone. The term "tranquil zone" is understood to mean an area where the speed of the upflow is greatly reduced. The adsorbent media particles, especially those of smaller size, come to a stop against the deflection means and, because of the decrease in the speed of the upflow at the means of deflection, they fall to the bottom of the reactor. The downstream area is thus almost free of adsorbent media particles and a treated fluid, free of suspended adsorbent media particles, can be recovered.

The means of deflection enable the use of fluid upflow speeds greater than those generally used in prior-art plants while greatly reducing or even preventing any leakage of adsorbent media particles. Thus, this gives a more compact plant. In addition, the deflection means dispense with the need for using ballast or weighting polymers even at relatively high fluid upflow speeds.

The fluid to be treated can be any fluid whatsoever comprising pollutant substances that can be adsorbed by an adsorbent medium. The fluid to be treated can especially be water contaminated by organic substances, micropollutants and/or metal ions.

The adsorbent media particles are grains or micrograins chosen from among activated carbon, resin, clay, zeolite, manganese dioxide, iron oxyhydroxide, or a mixture thereof. The adsorbent medium can especially be activated carbon in the form of micrograins or grains. The nature of the adsorbent medium is chosen as a function of the nature of the pollutants in the fluid to be treated.

The bed of adsorbent media preferably has a height of 0.2 m to 1.20 m.

The reactor according to the invention can be cylindrical or square shaped. Preferably, the reactor has a height of 3 meters to 10 meters. Very preferably, the reactor has a height of 3 meters to 6 meters.

The means for injecting and distributing fluid to be treated enable the injection of the fluid to be treated at the bottom part of the reactor to form an upflow of fluid within the reactor and obtain the fluidization and expansion of the bed of adsorbent media particles. Advantageously, the means for injecting and distributing fluid enable a uniform distribution of the fluid at the bottom part of the reactor. This can be implemented especially by feeder ramps uniformly distributed at the bottom part of the reactor.

According to a first embodiment, the means for deflecting fluid comprise blades that are mutually parallel and inclined relative to the vertical by an angle θ.

Their inclination relative to the vertical and their sizing can be adjusted as a function of the range of particle size of adsorbent media particles used. The following relationship is used to compute the cut-off threshold for the blades, the cut-off threshold being the property of a physical barrier hereby it physically stops all elements whose size exceeds a borderline value.

$$d_p = \sqrt{\frac{18\mu_0\left[\sin\theta + \frac{l}{s}\cos\theta\right]}{g(\rho_p - \rho)\left[1 - (1 - \phi_s)\left(\sin\theta + \frac{l}{s}\cos\theta\right)\right]}}$$

where:
$d_p$: diameter of the particle (m);
$\rho_p$: density of the particle (kg/m³);
$\mu_0$: viscosity of water (kg/m·s);
$\rho$: density of water (kg/m³);
$\theta$: angle of inclination of the blades relative to the vertical (degrees);
l: length of a blade (m);
s: surface area of a blade (m²);
$\varphi_S$: volume fraction of solids.

The blades can be inclined relative to the vertical by angle $\theta$ of 50° to 60°. Advantageously, the blades can in particular be inclined relative to the vertical by an angle $\theta$ close to 60°.

The blades can be spaced apart from one another by a distance of 25 mm to 100 mm. The blades can especially be spaced apart from one another by a distance of 36 mm to 42 mm. This spacing is particularly appropriate for adsorbent media particles, especially grains or micrograins of activated carbon, with a particle size of 400 to 1300 μm.

The length of the blades is very great as compared with the spacing between the blades. It can for example be of the order of one meter and, in particular, it can be equal to one meter.

In this first embodiment, the blades are disposed against the entire upflow of fluid. The speed of the water diminishes within the blades, enabling the creation of a tranquil zone where the particles can settle. The treated fluid can then be recovered by overflow.

According to a second embodiment of the invention, the means for recovering fluid comprise a prism-shaped chute with side faces forming an angle $\alpha$ of 45° to 70° relative to the horizontal, each side face being provided with a first spout for fluid and a deflector serving as a baffle as a deflection means. The angle $\alpha$ can especially have a value close to 60°. Such a chute has been described in the patent application published under number: FR2694209.

The deflector of the chute can be constituted by a smooth plate. It can take on the appearance of a grid having a mesh size adapted to the dimensions of the adsorbent media particles. Advantageously, it can be constituted by a stack of plates or an outline forming a honeycomb conduit. The orientation of the deflector is variable. According to one advantageous embodiment, it is placed in a direction parallel to the first water spout.

According to one advantageous embodiment, the first fluid spout is provided at its lower extremity with a flexible and mobile flap providing a clack-valve action.

According to another advantageous embodiment, the first spout is oriented in a direction orthogonal to the side faces of the chute.

In addition, according to another advantageous embodiment, the upper edges of the chute are folded so as to form a second spout through which the treated fluid, free of adsorbent media particles, can be recovered.

In this second embodiment, a part of the flow of fluid is shed over the first spout of the chute and is slowed down by the baffle, thus creating a local tranquil zone. The adsorbent media particles tend to fall by gravity while the treated fluid, which is totally free of adsorbent media particles, get collected and can be recovered.

The reactor according to the present invention can also comprise a means of recirculation of the treated fluid. This means of recirculation sends back at least one part of the treated fluid along with the fluid to be treated and therefore diminishes the concentration of pollutants in the fluid to be treated.

The reactor according to the present invention can also include a means for extracting adsorbent media particles and a means for injecting adsorbent media particles making it possible respectively to remove a part of the fluidized bed of adsorbent media particles in the reactor and add fresh or refreshed adsorbent media particles into the reactor. This therefore makes it possible to renew the bed of adsorbent media particles by removing adsorbent media particles that are at least partly saturated with pollutant substances that get adsorbed therein and by injecting fresh or refreshed adsorbent media particles.

The plant according to the present invention can also include a unit for separating adsorbent media particles extracted from the reactor by solid/liquid filtration. This separates the adsorbent media particles from a liquid phase by filtering the extracted part of the fluidized bed through the extraction of adsorbent media particles from the reactor so as to, on the one hand, at least partly remove saturated adsorbent media particles in order to provide for their treatment, refreshing or discarding and, on the other hand, recover a liquid phase that can be recirculated with the fluid to be treated. The filtration unit can for example be a filtration bucket or any other equivalent device enabling the concentration by filtration of the adsorbent media particles.

Finally, the plant according to the present invention can also include an analysis unit used to measure the adsorption capacity of samples coming from the fluidized bed. In the case of activated carbon, the analysis unit can especially measure the iodine value of the activated carbon.

The present invention also relates to a method for treating a fluid to be treated in a plant as described here above.

The method comprises a supplying of adsorbent media particles forming a bed of adsorbent media particles in the reactor. The method also comprises a continuous injection of fluid to be treated at said fluid injection means in order to form an upflow of fluid, having a speed enabling the fluidization of the bed of media particles and its expansion. The method finally comprises a continuous recovery of treated fluid at the means for recovering treated fluid.

Thus, the method according to the invention enables the continuous treatment of a fluid to be treated while, at the same time, limiting or even eliminating leakages of adsorbent media particles. In addition, relatively high upflow speeds can be used to obtain a rate of expansion of the fluidized bed of adsorbent media particles that is high enough to obtain efficient treatment of the bed of adsorbent media particles without in any way being concerned about the leakage of adsorbent media particles.

The method according to the invention is particularly suited to the tertiary treatment of wastewater or else to the production of potable water and especially the treatment of pollutant substances that are organic substances, micropollutants and/or metal ions.

Advantageously, the speed of the upflow is adjusted in such a way as to form an area of expansion of the bed of adsorbent media particles and a transition area interposed between the area of expansion and the deflection means, the concentration in adsorbent media particles being less dense in the transition area than in the area of expansion. The transition area interposed between the area of expansion of the bed of adsorbent media and the means of deflection comprises only the finest adsorbent media particles. It is only these finest particles that are stopped at the deflection means. The speed of the upflow of fluid can especially be adjusted in such a way as to obtain an average rate of expansion of the bed of adsorbent media particles ranging from 10% to 90%. The term "average rate of expansion" is understood to mean the rate of expansion computed for an adsorbent media particle of average size. The average rate of expansion can especially be close to 60%.

According to particular embodiments, the duration allotted to the adsorbent reaction can be adjusted so as to range from 5 to 20 minutes.

The concentration of adsorbent media particles in the reactor can range from 1 g/L to 300 g/L. Preferably, the concentration of adsorbent media particles ranges from 1 g/L to 100 g/L. In particular embodiments, the treated water is recirculated at least in part in the reactor. This reduces the initial concentration in pollutant substances and therefore reduces the necessary dosage of adsorbent media particles.

According to one advantageous embodiment, the method further comprises a continuous or sequential extraction of a part of the bed of adsorbent media particles from the reactor and an injection of fresh or refreshed adsorbent media particles in such a way as to preserve a constant concentration of adsorbent media particles in said reactor. This makes it possible to at least partly replace adsorbent media particles saturated with pollutants by fresh or refreshed adsorbent media particles. Preferably, the method further comprises a solid/liquid separation of the extracted part of the bed of adsorbent media particles, enabling the concentration of the adsorbent media particles and the recovery of a liquid phase. This liquid phase can be reinjected into the reactor. This limits fluid losses in the method. The concentrated adsorbent media particles can be discarded or else, as an alternative, they can be refreshed. In one particularly advantageous embodiment, the method can further include taking a sample from the bed of adsorbent media particles of said reactor and an analysis of the rate of saturation in pollutant substances of particles of said sample taken, the extraction of a part of the bed of adsorbent media particles from said reactor being implemented sequentially when the rate of saturation surpasses a threshold value. Such an implementation significantly reduces the consumption in adsorbent media particles. For example, when the adsorbent media is activated carbon, the rate of saturation of the particles can be controlled by the iodine value (which on the contrary indicates the adsorption capacity of activated carbon). This measurement of the iodine value can especially be carried out according to the international ASTM standard no. D4607. An iodine value below 300 mg/g can advantageously be chosen to initiate the renewal of adsorbent media particles.

The adsorbent media particles are grains or micrograins chosen from among the following: activated carbon, resin, clay, zeolite, manganese dioxide, iron oxyhydroxide, or a mixture thereof.

According to one particular embodiment, the adsorbent media particles are particles of activated carbon. These particles can be calibrated with a particle size of 400 to 1300 nm, preferably 600 to 1300 nm, preferably 600 to 1000 nm. In this embodiment, the speed of the upflow of fluid, especially when the fluid is water to be treated, can range from 20 m/h to 40 m/h. Such speeds enable sufficient expansion of the fluidized bed of adsorbent media particles to carry out optimal treatment without in any way causing a leaking of particles.

5. LIST OF FIGURES

The invention as well as its different advantages will be understood more easily through the following description of two particular embodiments given with reference to the drawings in which.

6. DETAILED DESCRIPTION OF ONE EMBODIMENT

Figure 1:
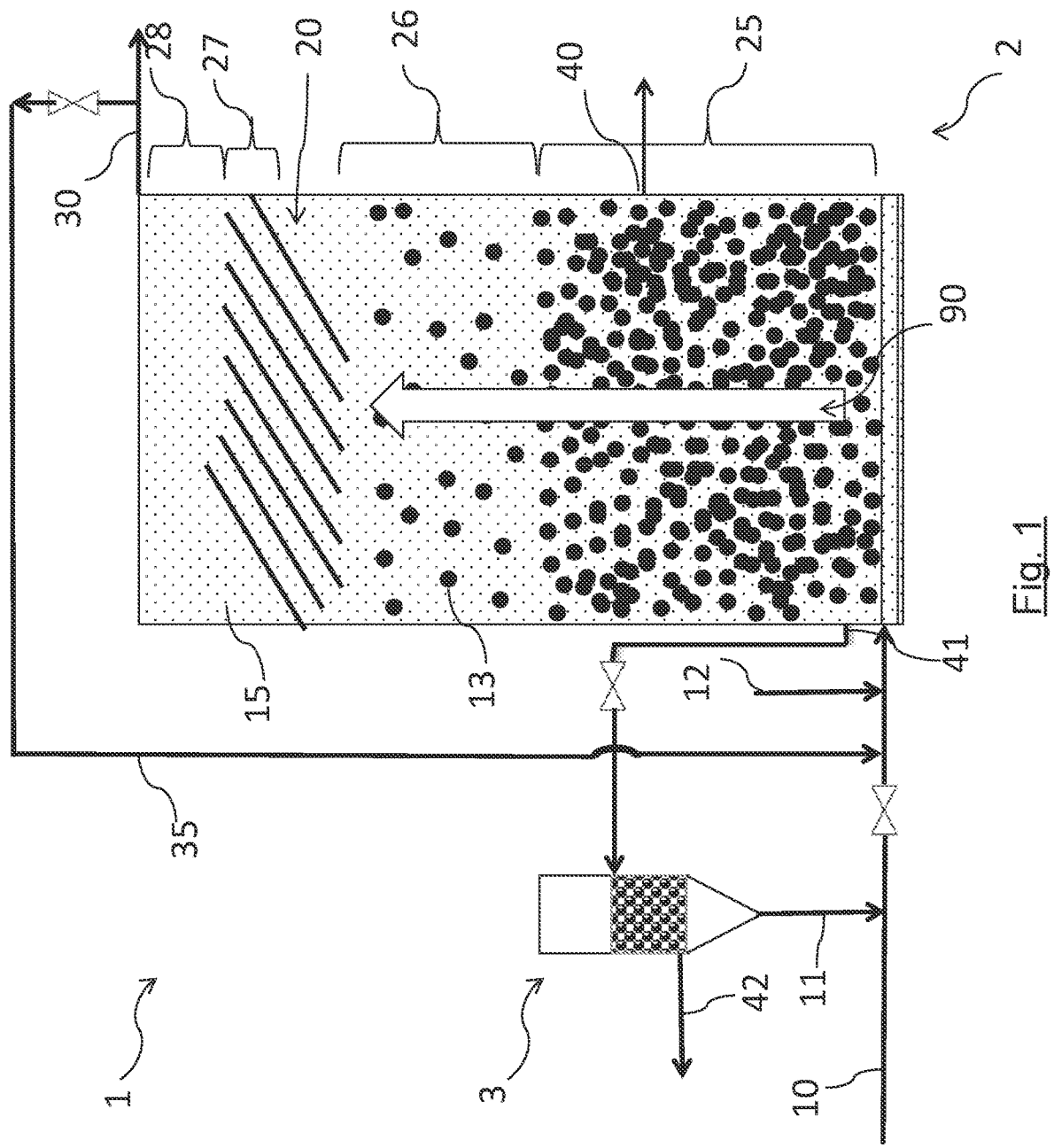
FIG. 1 is a schematic view of a plant for which the upflow reactor comprises blades that are inclined and mutually parallel.

Referring to FIG. 1, a plant 1 intended for the tertiary treatment of wastewater or the production of potable water is shown. The plant 1 comprises a reactor 2 containing a bed of activated carbon particles 13.

The activated carbon particles 13 have a particle size calibrated between 600 and 1300 µm and generally comprise a proportion strictly below 5% of particles of a size smaller than 400 µm. The concentration in particles 13 of activated carbon can be adjusted to a concentration of 1 g/L to 100 g/L depending on the type of water to be treated.

The reactor 2 as represented is cylindrical. The height of this type of reactor generally ranges from 3 meters to 10 meters.

A water intake pipe 10 provides water to be treated that is injected into the reactor 2. The water to be treated is injected by feeder ramps disposed in the lower part of the reactor 2 and enabling a uniform distribution of water 15 in the reactor. This enables the formation of an upflow 90 of water 15 within the reactor 2. The upflow 90 of water has such a speed that it causes the fluidizing and expansion of the particle bed 13 of activated carbon.

Figure 2:
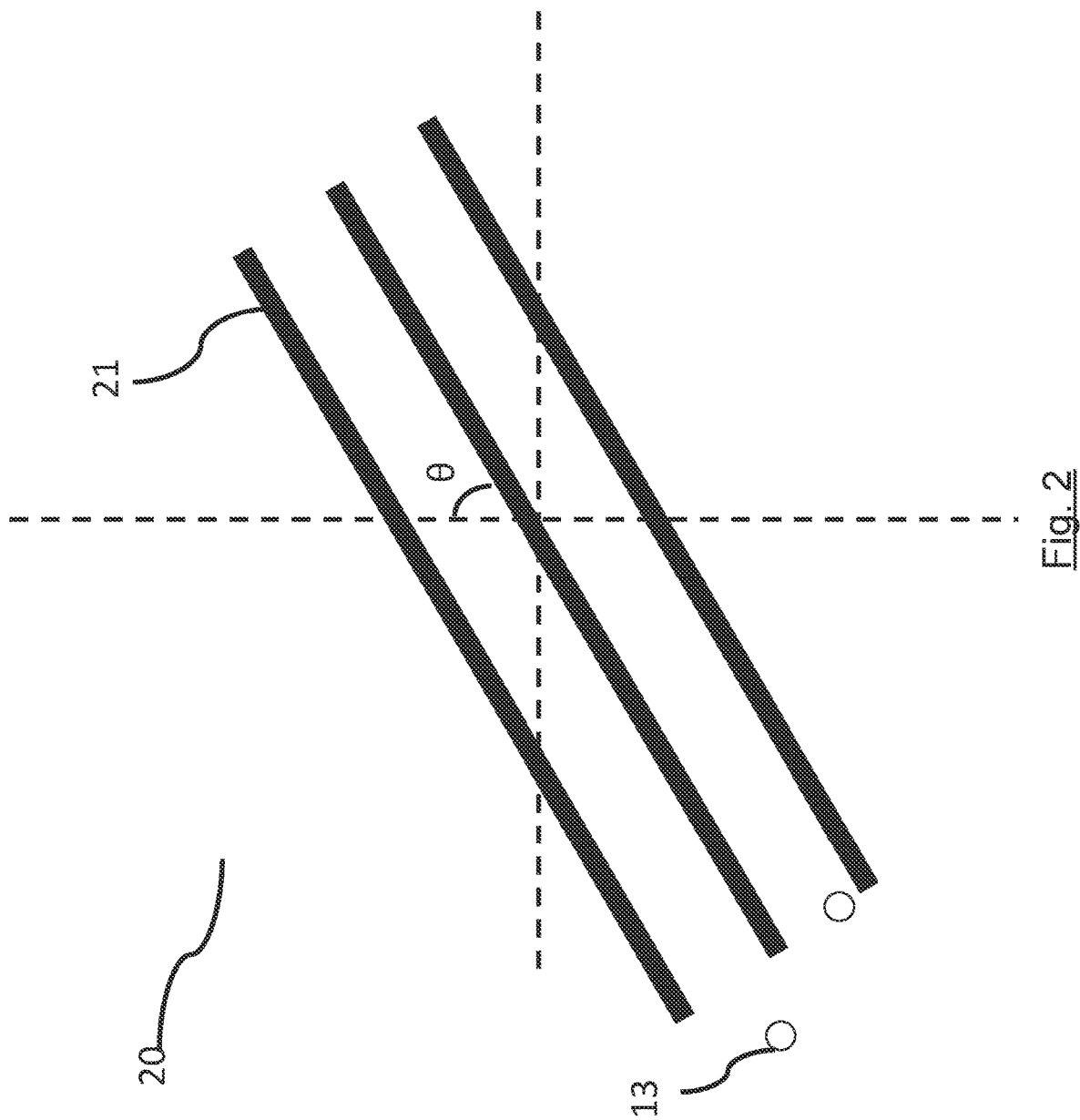
FIG. 2 represents the inclined blades of the reactor of the plant according to FIG. 1.

Referring in addition to FIG. 2, a set 20 of blades 21, inclined relative to the vertical by an angle θ close to 60° and spaced apart from one another by a distance of 36 to 42 mm, is disposed at the top part of the reactor 2. The blades have a length of about one meter. The set 20 of blades 21 enables the deflection of the upflow 90 and thus greatly reduces the speed of the incident flow, thus forming a tranquil zone 27. The particles 13 having arrived at the blades 21 get deposited on the blades 21 and flow downwards, therefore tending to drop into the bottom of the reactor by gravity. In the area 28 situated above said set 20 of blades 21, the water 15 no longer contains particles 13.

The speed of the water upflow 90 is computed so that it does not surpass a rate of expansion of the bed by 60% for a particle size of 0.8 mm. This enables the formation of an area of expansion 25 of the fluidized bed in which a large majority of the particles 13 of the fluidized bed are situated. This also enables the formation of a transition area 26 with a height of at least one meter to 1.5 meters beneath the set 20 of blades 21 in which the particles 13 are weakly concentrated. In this case, only those finest particles (<0.4 mm) that would have an expansion of 100% or more will be stopped by the set 20 of blades 21.

The reactor 2 works continuously at speeds of water upflow 90 generally ranging from 8 to 40 m/h, especially at upflow speeds ranging from 20 to 40 m/h. These flow speeds cannot be attained with prior-art reactors without causing major leakages of activated carbon. The speed of the upflow 90 can also be adjusted according to the desired duration allotted for the adsorption reaction. This duration can range from 5 min to 20 min.

Treated water is recovered by overflow in a pipe 30. At least one part of the treated water is recirculated in the reactor 2 through a pipe 35 enabling this part of recirculated treated water to be mixed with the water to be treated. This especially makes it possible to reduce the consumption of activated carbon. The fact is that by recirculating 50% of the flow of water with a COD of 2 mg/L, it is possible to pass from raw water to be treated, having a COD of 6 mg/L, to water to be treated, after mixing, having a COD of 4.66 mg/L. Thus, recirculation reduces the necessary dosage of activated carbon.

Samples of the fluidized bed of particles 13 of activated carbon are regularly taken by means of an outlet 40 disposed at the middle part of the reactor 2.

The iodine value of these samples is assessed in an analysis unit (not shown). The fresh activated carbon has a variable iodine value generally ranging from 900 to 1200 mg/g. The greater the extent to which the activated carbon becomes saturated in adsorbent substances, the less efficient it becomes for the treatment of water and the greater the reduction in the iodine value. A measurement of the iodine value above 300 mg/g allows the fluidized activated carbon bed to be maintained in the reactor. On the contrary, an iodine value lower than or equal to 300 mg/g means that the fluidized activated carbon bed must be renewed at least in part. To this end, an outlet 41, preferably disposed at the bottom part, enables the extraction, by a mechanical or hydraulic extraction device, of at least one part of the fluidized bed from the reactor 2. In parallel, in order that the concentration in activated carbon particles 13 should remain constant within the reactor 2, fresh activated carbon particles or refreshed activated carbon particles must be introduced into the reactor 2 at an activated carbon injection point 12. This sequential process of regular analyses of the iodine value of samples of the fluidized bed and of extraction from the fluidized bed, at least in part, when the iodine value becomes lower than or equal to 300 mg/g, reduces the consumption in activated carbon particles by 20% to 40%, as compared with methods where the activated carbon particles are periodically replaced without taking account of their higher or lower degrees of saturation.

The part of the fluidized bed extracted at the outlet 41 is then filtered into a filter bucket 3 or an equivalent (for example a filtering sieve). The recovered liquid phase, called drips, can then be recirculated in the reactor 2 by means of a pipe 11 enabling them to be mixed with the water to be treated. The water losses according to the method of treatment are therefore very low and remain below 1%. A concentrate of activated carbon particles can be discharged via an outlet 42 to be discarded or refreshed.

Figure 3:
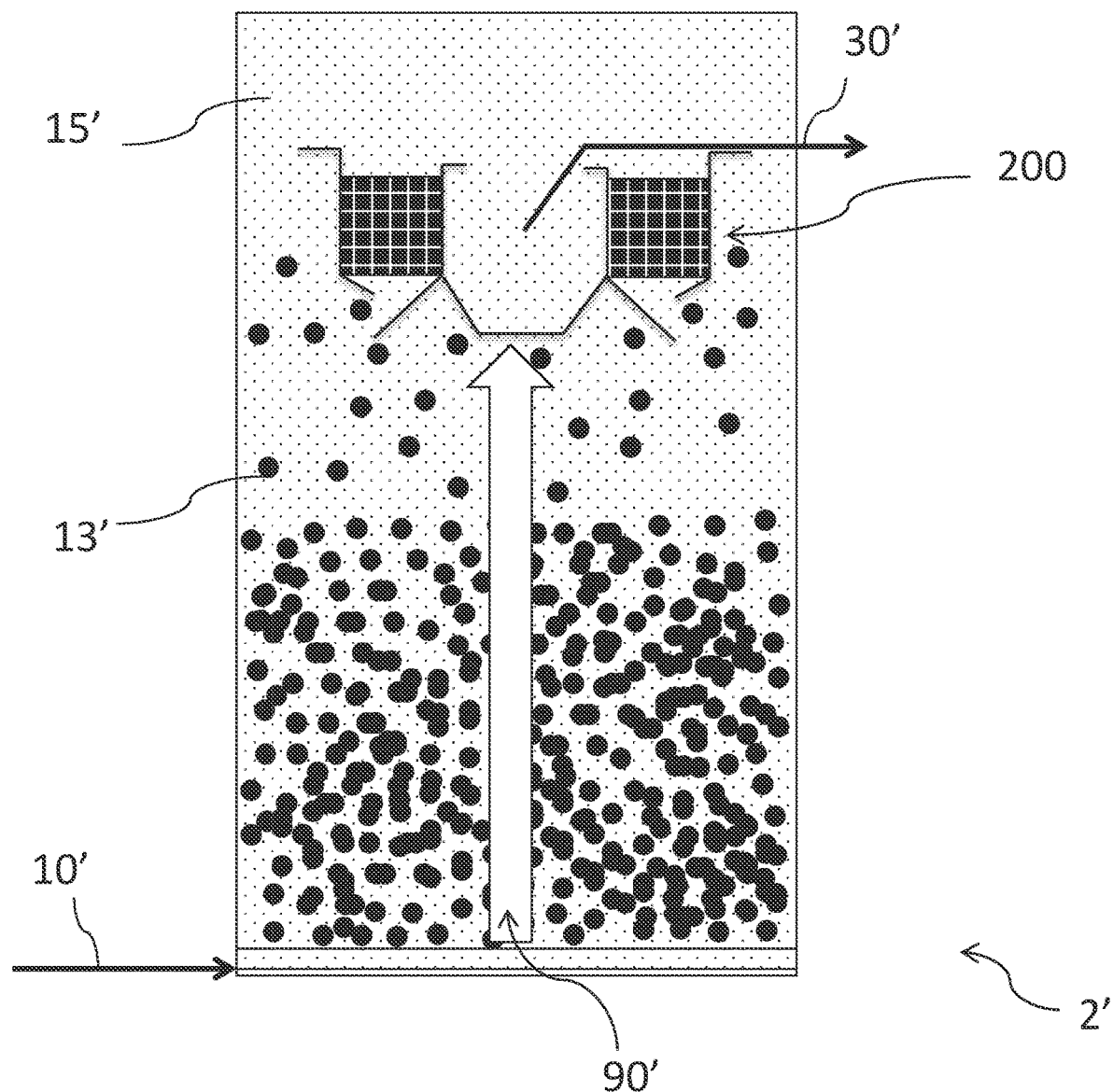
FIG. 3 is a schematic view of an upflow reactor comprising chutes provided with baffles.

FIG. 3 shows a reactor 2' with a deflection means alternative to the set 20 of blades 21 and an alternative means for collecting and discharging water by chute. Such a reactor 2' can form part of a plant as described here above and can be used in a method as described here above using the same parameters. The description here below is focused on the elements differentiating the reactor 2' from the reactor 2 described here above.

A water inlet pipe 10' provides water to be treated injected into the reactor 2'. The water to be treated is injected by water feeder ramps disposed at the lower part of the reactor 2' and enables a uniform distribution of water 15' into the reactor 2'. This enables the formation of an upflow 90' of water 15' within the reactor 2'. The upflow 90' of water causes the fluidization and expansion of the bed of particles 13' of activated carbon. The chutes 200 are provided with deflectors. These deflectors are spaced at 50-200 mm from the side faces of the chutes. They act as baffles and prevent the suspended particles from going out with the treated water. The particles are reinjected into the reactor.

Figure 4:
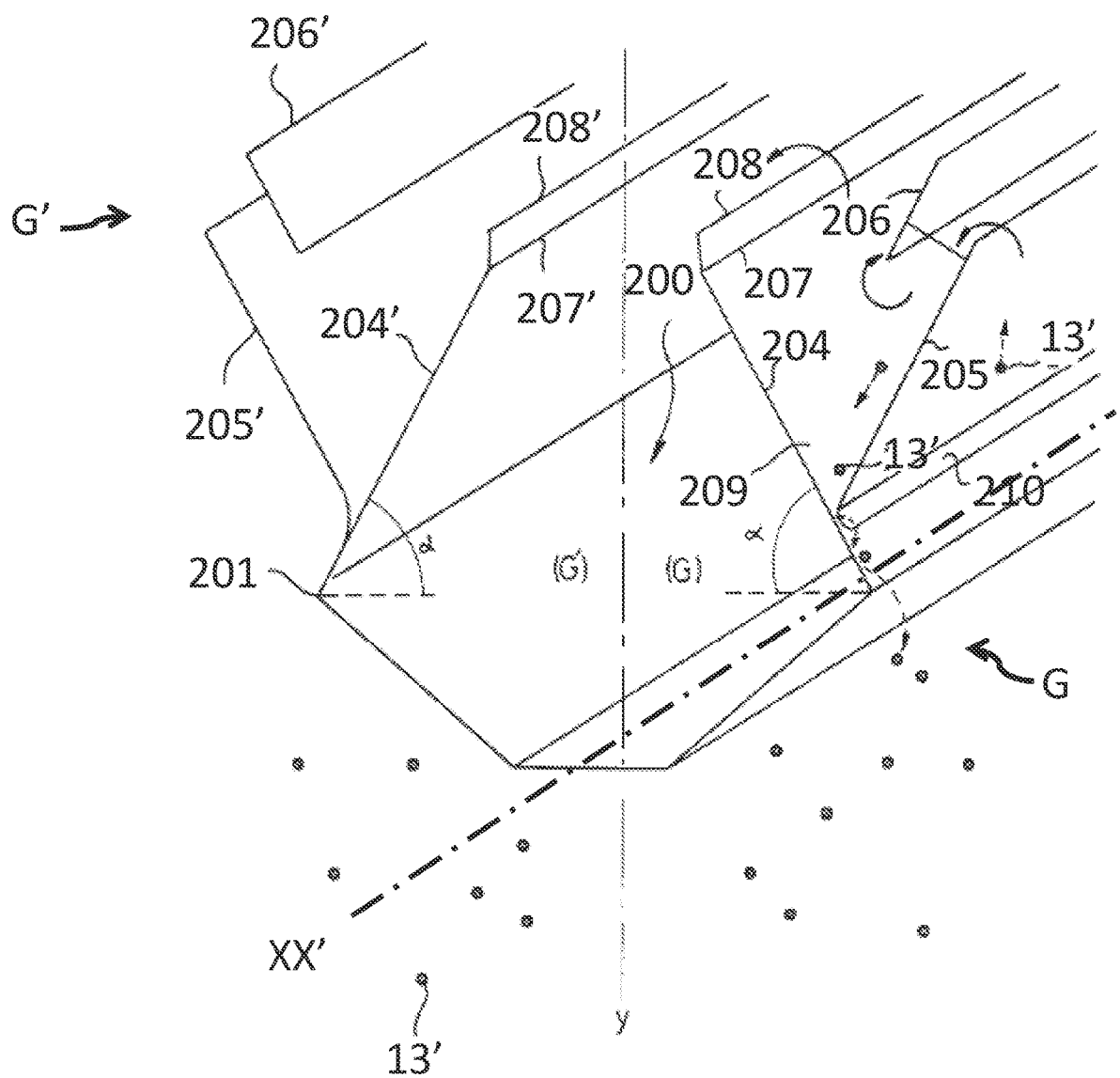
FIG. 4 represents a chute of the reactor of the plant according to FIG. 3.

Referring to FIG. 4, a chute 200 disposed at the top part of the reactor acts as a deflection means and enables the recovery of the treated water almost free of particles 15' in a pipe 30'. The chute 200 has a prism-type polyhedral shape, the side faces of which (204, 204') form an angle α of 45° to 70° relative to the horizontal. Preferably, the side faces form an angle of 60° relative to the horizontal. The side faces of the chute are each provided with a first water spout (205, 205') facing a deflector (206, 206') constituting a baffle.

The upper edges (207, 207') of the chute 200 are advantageously folded with a variable inclination to constitute a second spout (208, 208'). The first water spout 205 is preferably oriented in an orthogonal direction relative to the side faces of the chute 200. Owing to its prismatic configuration, the chute is built symmetrically around the central axis XX' and is thus constituted by two half-chutes G, G'. Here below, the description will be limited to a description of the path taken by the water in the semi-chute G, symbolized by small arrows in FIG. 4. The water upflow 90' drives the finest particles 13' towards the first water spout 205. After having reached the threshold of the first spout 205, the flow of water flows downstream from it. The water turbulence is then limited by means of the deflector 206 forming a baffle on the path of the flow. Preferably, and as shown, the deflector is constituted by a smooth plate. It can also take the appearance of a grid, the mesh size of which is adapted to the dimensions of the activated carbon grains that are to be retained. Advantageously, it can be constituted by a stack of plates or an outline forming a honeycomb conduit. The orientation of the deflector 206 is variable. Advantageously, it is placed according to a direction parallel to the first water spout 205. The flow of water striking the baffle is slowed down and channeled into in a tranquil zone 209 demarcated by the inclined side face 204 of the chute. The water then collects in this area and follows an upward path until it reaches the threshold of the second spout 208. Water free of particles 13' can thus be recovered downstream from the second spout 208. The activated carbon particles 13', carried along by the water flow, are also collected in the tranquil zone 209, and owing to the inclination of this area, they slide along the side face 204 of the chute until the lower extremity of the first spout 205. As can be seen in FIG. 4, the lower extremity of the first spout 205 can advantageously be provided with a mobile flap 210 acting as a clack-valve. The particles 13' by their weight lift the flap and return into the mass of the fluidized bed.

In the reactors 2 and 2', it is possible to use adsorbent media that are alternatives to activated carbon, especially in the form of particles of resin, clay, zeolite, manganese dioxide or again iron oxyhydroxide. The use of these alternative adsorbent media can cause minor modifications in size or modifications of the parameters of the method of treatment that those skilled in the art will be able to adapt, especially according the particle size and density of the adsorbent media particles.

The invention claimed is:

1. A method of treating a fluid containing pollutant substances by flowing the fluid upwardly through a bed of adsorbent particles having a size of 600-1300 μm, wherein the adsorbent particles are grains or micrograins selected from the group consisting of activated carbon, resin, clay, zeolite, manganese dioxide, iron oxyhydroxide, or a mixture thereof, the method comprising:
directing the fluid into the bottom of a reactor;

from the bottom of the reactor, directing the fluid upwardly through an expansion zone in the reactor and through the bed of adsorbent particles in the reactor;

fluidizing and expanding the bed of adsorbent particles in the expansion zone as the fluid flows upwardly through the reactor;

directing the fluid upwardly from the expansion zone through a transition zone in the reactor where the concentration of adsorbent particles in the transition zone is less than the concentration of adsorbent particles in the expansion zone;

directing the fluid from the transition zone upwardly through a particle deflector disposed in the upper portion of the reactor above the transition zone;

as the fluid passes through the particle deflector, the upflowing liquid is deflected and in the process a tranquil zone is created adjacent the particle deflector;

as the fluid passes through the particle deflector, at least some of the smaller adsorbent particles come to a stop against the particle deflector and thereafter fall towards the bottom of the reactor;

wherein the particle deflector reduces or prevents at least some of the smaller adsorbent particles from leaking past the particle deflector;

adsorbing at least some of the pollutant substances in the fluid onto the larger and smaller adsorbent particles as the fluid flows upwardly through the reactor; and directing treated fluid from the reactor and out an outlet disposed above the particle deflector and above the tranquil zone.

2. The method of claim 1 wherein the particle deflector includes a plurality of spaced apart blades that are angled relative to the upward flow of fluid.

3. The method of claim 2 wherein the blades are acutely angled approximately 60° with respect to the upward flow of the fluid.

4. The method of claim 1 including maintaining the speed of the upflowing fluid at 20-40 m/h.

5. The method of claim 1 including maintaining an area in the reactor above the particle deflector substantially free of adsorbent particles.

6. The method of claim 1 wherein the particle deflector comprises a prism-shaped chute with sides that form an angle α 45°-70° relative to a horizontal reference line.

7. The method of claim 1 including maintaining the average rate of expansion of the bed of adsorbent particles in the expansion zone from 10%-90%.

8. The method of claim 1 including extracting adsorbent particles from the reactor and subjecting the extracted adsorbent particles to a solid/liquid separation process that produces a liquid phase and injecting the liquid phase back into the reactor.

9. The method of claim 1 including:

taking a sample of the adsorbent particles from the reactor;

analyzing the saturation of pollutants adsorbed on the sample of adsorbent particles; and extracting a portion of the adsorbent particles from the reactor when the saturation of pollutants exceeds a threshold value.

10. The method of claim 1 including maintaining the upflow speed of the fluid through the expansion zone at 8-40 m/h.

11. The method of claim 1 wherein the adsorbent particles are activated carbon particles having a particle size calibrated between 600 and 1300 μm and generally comprising a proportion strictly below 5% of particles of a size smaller than 400 μm.

* * * * *